Nov. 20, 1962 R. D. RICHARDSON 3,064,465
GAS ANALYZING APPARATUS
Filed June 30, 1958 2 Sheets-Sheet 1
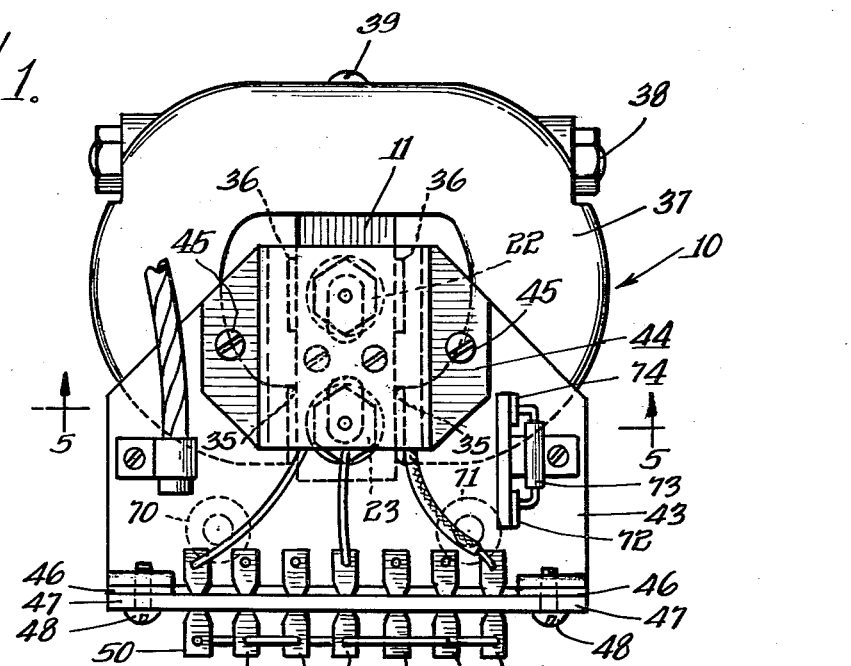
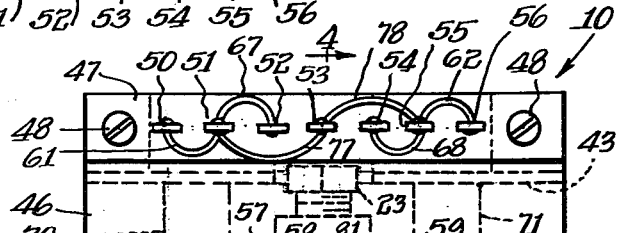
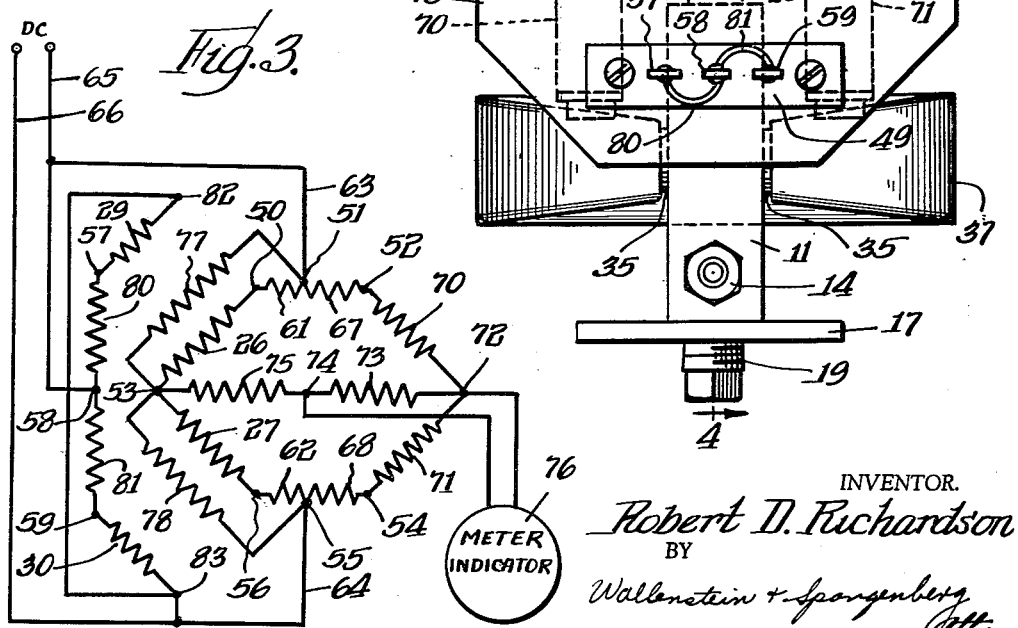
INVENTOR.
Robert D. Richardson
BY
Wallenstein + Spangenberg
Attys.

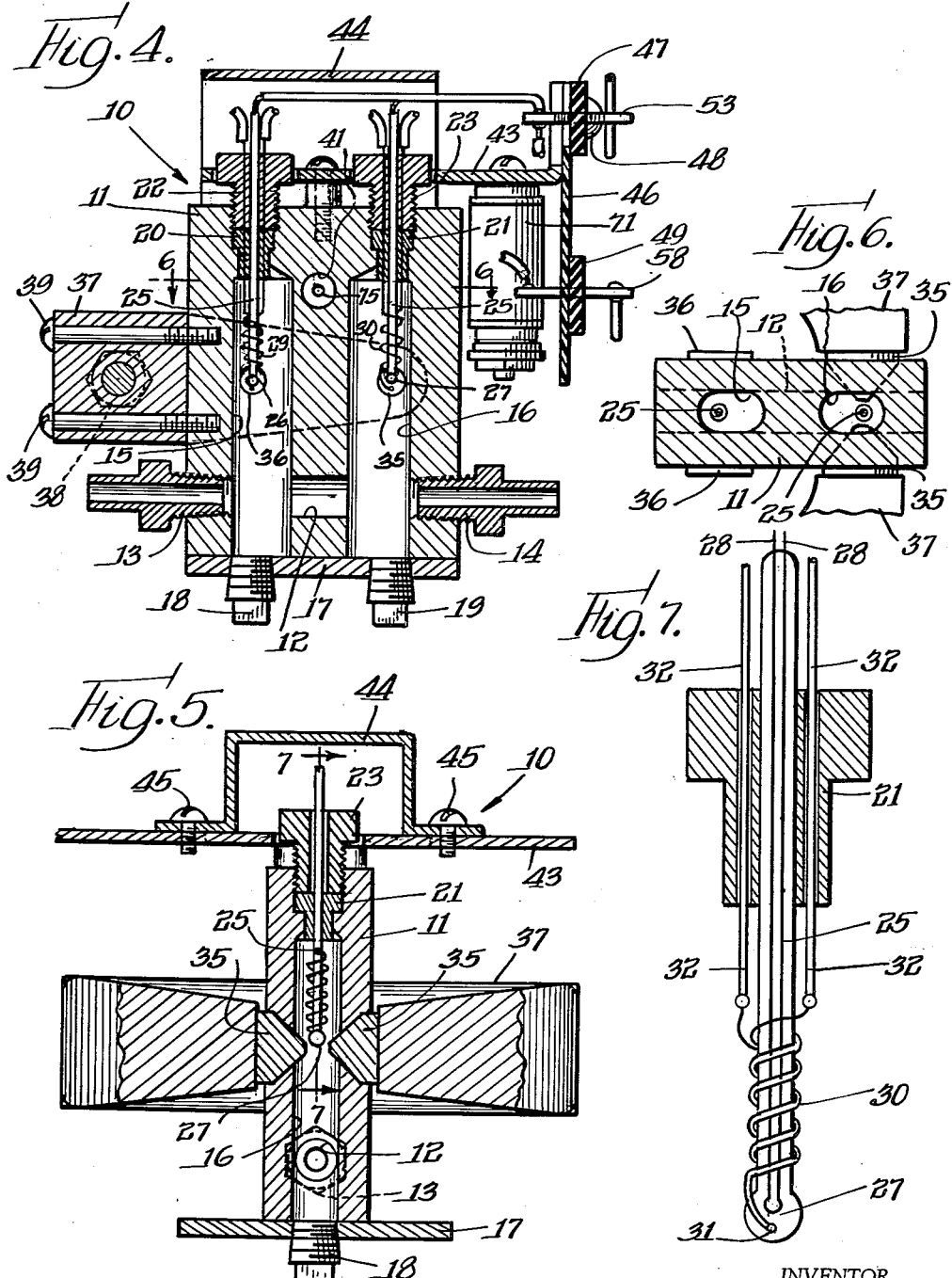

3,064,465
GAS ANALYZING APPARATUS
Robert D. Richardson, R.R. 5, Box 422A, Springfield Township, La Porte County, Ind.
Filed June 30, 1958, Ser. No. 745,748
6 Claims. (Cl. 73—27)

The principal object of this invention is to provide an improved gas analyzing apparatus, which is preferably of the paramagnetic type for measuring oxygen or the like as shown and described in Robert D. Richardson Patent No. 2,658,385, issued November 10, 1953, which is adapted to measure a paramagnetic constituent, such as oxygen, in a gas, which is more sensitive and accurate, which has substantially straight line calibration characteristics from 0 to 100% oxygen content in the gas, which is compensated for ambient temperature conditions, which may be compensated for different background gases, and which may be compensated for current conditions in the measuring bridge circuit and temperature-resistance coefficients of the measuring thermistors.

Briefly, the gas analyzing apparatus of this invention includes a test cell of non-magnetic material having a passage therethrough for the gas and a pair of like chambers communicating with the passage. A supporting member is suspended in each chamber and each supporting member carries a thermistor which is responsive to temperature conditions in that chamber. Each supporting member also carries a separate heater element for heating the gas in its chamber, the heating elements performing solely heating functions and the thermistors performing solely temperature measuring functions. As a result, each performs its own function in the most accurate and efficient manner without interference from the other and without the need for compromising as where a single element would perform both functions.

A magnet has its poles oppositely arranged across one of the chambers adjacent the thermistor of that chamber and due to the paramagnetic effect of oxygen, the magnet and the heater element, the gas is caused to circulate in that chamber past the thermistor in that chamber. The thermistors in the two chambers, in responding to the temperature conditions therein, provide a measure of the oxygen content of the gas, the thermistors being connected into a measuring bridge circuit for this purpose which is separate from the circuit for heating the heater elements.

The test cell is also provided with a well in which is located a compensating thermistor which responds to the ambient temperature of the test cell. This compensating thermistor is connected into the measuring bridge circuit to automatically compensate for changes in ambient temperature conditions. Compensating resistors are also connected into the heater circuit to regulate the current flow through the heater elements to compensate for various background gases. Compensating resistors are also connected into the measuring bridge for compensating for current conditions therein and for the temperature-resistance coefficients of the measuring thermistors.

Preferably, the chambers in the test cell are substantially oval in transverse direction and the supporting members are arranged eccentrically to the axes of the chambers, the magnet for said one chamber also being eccentrically arranged. By reason of this arrangement circulation of the gas in the chamber is greatly enhanced.

The features of this invention are also beneficial in other types of gas analyzing apparatuses, such as the type for measurement of combustibles in gases; and of the thermal conductivity type. In the former, the magnet is omitted and one of the supporting elements is provided with a catalyst to raise the temperature in that chamber in accordance with the combustibles in the gas. In the latter, the magnet is also omitted and the pair of chambers are prevented from communicating with each other, one chamber receiving a standard gas and the other chamber receiving the gas under test.

Further objects of this invention reside in the details of construction of the gas analyzing apparatus and in the cooperative relationships between the component parts thereof.

Other objects and advantages of this invention will become apparent to those skilled in the art upon reference to the accompanying specification, claims and drawings in which:

FIG. 1 is a top plan view of the gas analyzing apparatus of this invention.

FIG. 2 is a front elevational view thereof.

FIG. 3 is a wiring diagram of the gas analyzing apparatus.

FIG. 4 is a vertical sectional view taken substantially along the line 4—4 of FIG. 2.

FIG. 5 is a vertical sectional view taken substantially along the line 5—5 of FIG. 1.

FIG. 6 is a horizontal sectional view taken substantially along the line 6—6 of FIG. 4.

FIG. 7 is an enlarged sectional view taken substantially along the line 7—7 of FIG. 5.

The gas analyzing apparatus of this invention is generally designated at 10 and it includes a test cell 11 formed of non-magnetic material such as brass or the like. The test cell is provided with a horizontal passage 12 extending therethrough, one end of the passage being provided with a fitting 13 for introducing a gas to be analyzed into the cell and the other end being provided with a fitting 14 for drawing gas from the test cell. Vertically arranged within the test cell are two like elongated chambers 15 and 16, these chambers preferably being substantially oval shaped in transverse direction. The chambers 15 and 16 communicate with the passage 12 so that the gas to be analyzed enters into the two chambers. The bottom of the test cell is closed by a base plate 17 suitably secured thereto as by brazing or the like. This base plate 17 is provided with a pair of holes which communicate with the chambers 15 and 16 so as to provide access to the interior of the chambers. These holes are normally closed by suitable plugs 18 and 19. The upper ends of the chambers 15 and 16 are provided with shouldered holes for receiving shouldered members 20 and 21 which are secured in place by sealing nuts 22 and 23.

A pair of supporting members 25 are suspended in the chambers 15 and 16 by the shouldered members 20 and 21, these supporting members being formed from glass, ceramic or the like. The lower ends of these supporting members are internally provided with thermistors 26 and 27, the thermistor 26 responding to the temperature conditions in the chamber 15 and the thermistor 27 responding to the temperature conditions in the chamber 16. Suitable leads 28 extend upwardly through the supporting members 25 from the thermistors 26 and 27 for external connection. The supporting member 25 in the chamber 15 is also provided with a heater element 29 and, likewise, the supporting member 25 is provided with a heater element 30, the heater elements 29 and 30 being wrapped around the supporting members and being secured at their lower ends to the lower ends of the supporting members. The upper ends of the heater elements 29 and 30 are soldered to copper lead wires 32 which extend upwardly through the shouldered members 20 and 21 for external connection purposes. The heater elements 29 and 30 operate to heat the gas in the chambers 15 and 16 and the thermistors 26 and 27 respond to the temperature conditions in said chambers, respectively.

As will be noted, the supporting members 25 and the thermistors and heater elements carried thereby are eccentrically located with respect to the central axes of the oval shaped chambers 15 and 16. The plugs 18 and 19 are preferably in alignment with the supporting members 25 so that the supporting members 25 may be visually accurately positioned within the chambers 15 and 16 when the plugs are removed.

A pair of pole pieces 35 of magnetic material are oppositely arranged across the chamber 16 adjacent to but slightly below the thermistor 27 and a pair of similar pole pieces 36 are arranged in the chamber 15 adjacent the thermistor 26 so as to make the internal configuration of the chamber 15 correspond to the internal configuration of the chamber 16. A permanent horseshoe magnet 37 engages the pole pieces 35 of the chamber 16, the magnet being clamped against the pole pieces by means of a through-bolt 38 and being secured to the test cell 11 by means of screws 39. The magnet 37 operates in conjunction with the pole pieces 35 in the chamber 16 for producing a concentrated magnetic field across the chamber 16 in alignment with and slightly below the thermistor 27. Because oxygen is paramagnetic when it is relatively cool, the oxygen containing gas is attracted between the pole pieces 35. The heater element 30, however, heats the gas so attracted and, as a result, the oxygen in the heated gas loses its paramagnetic effect and the heated gas is continuously replaced by cooler gas. As a result, the pole pieces of the magnet and the heater operate to cause a continuous circulation in the chamber 16 of the oxygen containing gas, the amount of circulation being dependent upon the oxygen content of the gas. The thermistor 27 measures the temperature conditions in the chamber 16, the temperature of the supporting member 25 as it is cooled by the gas circulating thereby, and accordingly provides a means for measuring the oxygen content of the gas.

The test cell 11 is provided with a transverse well 41 between the chambers 15 and 16 and a compensating thermistor 75 is arranged within this well 41 so as to respond to the ambient temperature conditions of the test cell 11.

A plate 43 is suitably carried by the test cell 11 and a cover 44, secured to the plate 43 by screws 45, overlies the upper ends of the supporting members 25 so as to protect and cover the electrical connections to the thermistor and heater element leads 28 and 32. Screws 48 secure an auxiliary plate 46 and a terminal strip 47 to the plate 43, the auxiliary plate 46 also being provided with a terminal strip 49. The terminal strip 47, formed of suitable electrical insulating material, carries terminals 50 to 56 inclusive and the terminal strip 49, also formed of suitable electrical insulating material, carries terminals 57, 58 and 59.

Referring more particularly to FIGS. 2 and 3, the thermistor 26 is connected across terminals 50 and 53 and the thermistor 27 is connected across terminals 56 and 53. A resistor 61 is connected between terminals 50 and 51 and a resistor 62 is connected between terminals 55 and 56. The resistors 61 and 62, which have substantially no temperature-resistance coefficient, are selected to compensate for the temperature-resistance coefficients of the thermistors 26 and 27. The terminals 51 and 55 are connected by conductors 63 and 64 to the power supply lines 65 and 66, which are preferably D.C. but which may be A.C. A resistor 67 is connected between terminals 51 and 52 and a resistor 68 is connected between terminals 55 and 54. The resistors 67 and 68 are selected to provide the final balance of the measuring bridge circuit. Balancing resistors 70 and 71 are connected respectively to the terminals 52 and 54 and to a terminal 72. A fixed meter resistor 73 is connected between terminals 72 and 74 and the compensating thermistor 75 in the well 41 is connected between terminals 74 and 53. A meter or indicator 76 is connected to the terminals 72 and 74. There is thus provided a measuring bridge circuit for comparing the temperature conditions existing at the thermistors 26 and 27 in the chambers 15 and 16 and the meter or indicator 76 responds to this comparison and indicates directly the volume percent of oxygen in the gas being analyzed. The compensation thermistor, which responds to the ambient temperature condition of the test cell, compensates for changes in ambient temperature conditions so that the oxygen reading of the meter or indicator 76 is not affected by changes in ambient temperature conditions.

A current compensating resistor 77 may be connected across terminals 51 and 53 and a current compensating resistor 78 may be connected across the terminals 55 and 53, these resistors 77 and 78 being selected so as to maintain uniform readings at the meter 76 by compensating for changes in current flow in the measuring bridge circuit.

A heater compensating resistor 80 is connected between terminals 57 and 58 and a heater compensating resistor 81 is connected between terminals 59 and 58. The terminal 58 is connected to the power supply line 65. The heater element 29 is connected between terminals 57 and 82 and the heater element 30 is connected between the terminals 59 and 83, the terminals 82 and 83 being connected together and to the other power supply line 66. As expressed above, the heater elements 29 and 30 heat the gas in the chambers 15 and 16 and by appropriate selection of the heater compensating resistors 80 and 81 the heating effect of the heater elements 29 and 30 may be regulated. The purpose of such regulation is to compensate for different background gases containing the oxygen to be measured.

Ordinarily and quite usually, the thermistors 26 and 27 do not match, they having different resistance values, different temperature-resistance coefficient values, and different conduction and radiation loss values, all of which must be compensated for to maintain bridge balance during the normal operation of the measuring system.

In setting up and calibrating the gas analyzing apparatus of this invention, the test cell is subjected to an oxygen-free gas such as nitrogen, the circuit is energized with a predetermined voltage and the resistances 67 and 68 are selected to balance the bridge and bring the reading on scale, the balance being measured by the meter. The resistances 77 and 78 are selected to substantially prevent unbalance of the bridge circuit due to changes in the current flow in the bridge circuit and the resistances 67 and 68 are selected to substantially prevent unbalance of the bridge circuit due to differences in the temperature-resistance coefficients of the respective thermistors.

The oxygen-free gas is changed, for example, from the original nitrogen to some other oxygen-free gas such as argon, and the change in the bridge balance is noted. The resistances 80 and 81 are then selected until there is no bridge unbalance by reason of the changes in said oxygen-free gases. This selection of the resistances 80 and 81 provides different heats at the respective heater elements in accordance with the expected constituents of the background gas and operates to substantially prevent unbalance of the bridge circuit due to changes in the background constituents of the gas.

At this point, the bridge circuit is completely zero compensated so that the foregoing variable factors will not upset the zero bridge balance. Then, with a background gas having a fixed amount of paramagnetic constituent, such as oxygen (air being a good example), the resistance 73 is selected to prevent a change in the oxygen content reading of the meter due to changes in the temperature of the test cell. Thus, percent of oxygen content in the gas may be accurately measured regardless of the temperature of that gas and also regardless of the aforementioned variables which may have an effect upon the balance of the bridge circuit.

One particular advantage of the gas analyzing apparatus of this invention is that the measuring of the temperatures in the two chambers can be efficiently, accurately and sensitively measured by commercial thermistors without any effects due to the magnetic forces or due to the passage of heating currents therethrough. The gases in the chambers are heated by the separate heater elements so that negative effects in the thermistors do not develop, which would be the case if the thermistors were used for heating purposes as well as measuring purposes. The separate heater elements allow the heating effect to be controlled individually from the measuring effect. This has an additional advantage, in that the compensation for variation in the background gases can be made more effectively. By varying the temperature of these heater elements, the measuring bridge circuit can be made insensitive to gases of different thermal conductivity. Another advantage of the gas analyzing apparatus of this invention is the linearity of the response. It has essentially linear response from 0 to 100% oxygen and particularly around the region of 0 to 5% oxygen the response is linear. This is apparently due to the small changes in temperature that can be determined by the thermistors.

The gas analyzing apparatus of this invention may be utilized for the measurement of combustibles in gases. Here, the magnet 37 is omitted and one of the supporting elements 25 is provided with a suitable catalyst to raise the temperature in its chamber in accordance with the combustibles in the gas. The gas analyzing apparatus of this invention may also be used for measuring thermal conductivity of a gas. Here, the magnet 37 is also omitted and the passage 12 between the chambers 15 and 16 is blocked off. The plugs 18 and 19 are replaced by suitable fittings. A standard gas having a known thermal conductivity is induced through fitting 13 into the chamber 15 and circulated therein and a gas to be analyzed is introduced through fitting 14 into the chamber 16 and circulated therein. The thermal conductivity of the gas in chamber 16 is compared with that of the standard gas in chamber 15 by measuring the temperatures thereof by means of the thermistors 26 and 27.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A gas analyzing apparatus for measuring a paramagnetic constituent in a gas comprising a test cell of non-magnetic material having a passage therethrough for the gas and a pair of like elongated chambers communicating at their ends with the passage, said chambers being substantially oval in transverse direction, a supporting member longitudinally suspended in each chamber eccentrically to the longitudinal axis of the chamber, a heater element carried by each supporting member for heating the gas in its chamber, a thermistor carried by each supporting member and responsive to temperature conditions in its chamber, means for circulating the gas in one of the chambers including a magnet having its poles oppositely arranged across the narrow dimension of said chamber on opposite sides of the thermistor in that chamber and eccentrically to the longitudinal axis of that chamber, a circuit for applying electric current to the heater elements for heating the same, and a measuring bridge circuit connected to the thermistors for comparing the temperature conditions in the pair of chambers.

2. A gas analyzing apparatus for measuring a paramagnetic constituent in a gas comprising a test cell of non-magnetic material having a passage therethrough for the gas and a pair of like chambers communicating with the passage, a supporting member suspended in each chamber, each supporting member carrying a heater element for heating the gas in its chamber and a thermistor responsive to temperature conditions in its chamber, a magnet having its poles oppositely arranged across one of the chambers adjacent the thermistor in that chamber for circulating the gas in said chamber, a measuring bridge circuit connected to the thermistors for comparing the temperature conditions in the pair of chambers, a separate circuit for supplying electric current to the heater elements for heating the same, and compensating means connected to a least one of the heater elements to provide different heats at the respective heater elements in accordance with the expected constituents of the background gas to substantially prevent unbalance of the bridge circuit due to changes in the background consistuents of the gas.

3. A gas analyzing apparatus for measuring a paramagnetic constituent in a gas comprising a test cell of non-magnetic material having a passage therethrough for the gas and a pair of like chambers communicating with the passage, a supporting member suspended in each chamber, each supporting member carrying a heater element for heating the gas in its chamber and a thermistor responsive to temperature conditions in its chamber, a magnet having its poles oppositely arranged across one of the chambers adjacent the thermistor in that chamber for circulating the gas in said chamber, a measuring bridge circuit connected to the thermistors for comparing the temperature conditions in the pair of chambers, a separate circuit for supplying electric current to the heater elements for heating the same, and compensating means connected to at least one of the heater elements to provide different heats at the respective heater elements in accordance with the expected constituents of the background gas to substantially prevent unbalance of the bridge circuit due to changes in the background constituents of the gas, a compensating thermistor responsive to the temperature of the test cell, a meter resistor, means for connecting the compensating thermistor and the meter resistor in series across the measuring bridge circuit, and a meter connected across the meter resistor, said meter resistor being selected to substantially prevent a change in the meter reading due to changes in the temperature of the test cell.

4. A gas analyzing apparatus for measuring a paramagnetic constituent in a gas comprising a test cell of non-magnetic material having a passage therethrough for the gas and a pair of like chambers communicating with the passage, a supporting member suspended in each chamber, each supporting member carrying a heater element for heating the gas in its chamber and a thermistor responsive to temperature conditions in its chamber, a magnet having its poles oppositely arranged across one of the chambers adjacent the thermistor in that chamber for circulating the gas in said chamber, a measuring bridge circuit connected to the thermistors for comparing the temperature conditions in the pair of chambers, a separate circuit for supplying electric current to the heater elements for heating the same, and compensating means connected to at least one of the heater elements to provide different heats at the respective heater elements in accordance with the expected constituents of the background gas to substantially prevent unbalance of the bridge circuit due to changes in the background constituents of the gas, and a compensating resistor connected across at least one of the pair of thermistors and selected to substantially prevent unbalance of the bridge circuit due to changes in the current flow in the bridge circuit.

5. A gas analyzing apparatus for measuring a paramagnetic constituent in a gas comprising a test cell of non-magnetic material having a passage therethrough for the gas and a pair of like chambers communicating with the passage, a supporting member suspended in each chamber, each supporting member carrying a heater element for heating the gas in its chamber and a thermistor responsive to temperature conditions in its chamber, a magnet having its poles oppositely arranged across one of the chambers adjacent the thermistor in that chamber for circulating the gas in said chamber, a measuring bridge circuit connected to the thermistors for comparing the temperature conditions in the pair of chambers, a separate circuit for supplying electric current to the heater elements for heating the same, and compensating means connected to at least one of the heater elements to provide different heats at the respective heater elements in accordance with the expected constituents of the background gas to substantially prevent unbalance of the bridge circuit due to changes in the background constituents of the gas, and a compensating resistor connected in series with at least one of the pair of thermistors and selected to substantially prevent unbalance of the bridge circuit due to differences in the temperature-resistance coefficients of the respective thermistors.

6. A gas analyzing apparatus for measuring a paramagnetic constituent in a gas comprising a test cell of nonmagnetic material having a passage therethrough for the gas and a pair of like chambers communicating with the passage, a supporting member suspended in each chamber, each supporting member carrying a heater element for heating the gas in its chamber and a thermistor responsive to temperature conditions in its chamber, a magnet having its poles oppositely arranged across one of the chambers adjacent the thermistor in that chamber for circulating the gas in said chamber, a measuring bridge circuit connected to the thermistors for comparing the temperature conditions in the pair of chambers, a separate circuit for supplying electric current to the heater elements for heating the same, and compensating means connected to at least one of the heater elements to provide different heats at the respective heater elements in accordance with the expected constituents of the background gas to substantially prevent unbalance of the bridge circuit due to changes in the background constituents of the gas, a compensating thermistor responsive to the temperature of the test cell, a meter resistor, means for connecting the compensating thermistor and the meter resistor in series across the measuring bridge circuit, and a meter connected across the meter resistor, said meter resistor being selected to substantially prevent a change in the meter reading due to changes in the temperature of the test cell, and a compensating resistor connected across at least one of the pair of thermistors and selected to substantially prevent unbalance of the bridge circuit due to changes in the current flow in the bridge circuit, and a compensating resistor connected in series with at least one of the pair of thermistors and selected to substantially prevent unbalance of the bridge circuit due to differences in the temperature-resistance coefficients of the respective thermistors.

References Cited in the file of this patent

UNITED STATES PATENTS

| | | |
|---|---|---|
| 2,429,555 | Langford et al. | Oct. 21, 1947 |
| 2,652,727 | Richardson et al. | Sept. 22, 1953 |
| 2,687,036 | Minter | Aug. 24, 1954 |
| 2,729,097 | Cherrier | Jan. 3, 1956 |
| 2,734,376 | Cherry et al. | Feb. 14, 1956 |
| 2,759,354 | Cherry et al. | Aug. 21, 1956 |
| 2,763,151 | Richardson | Sept. 18, 1956 |
| 2,768,069 | Thompson | Oct. 23, 1956 |
| 2,799,758 | Hutchins | July 16, 1957 |
| 2,883,857 | Thayer | Apr. 28, 1959 |
| 2,938,385 | Mack et al. | May 31, 1960 |

FOREIGN PATENTS

| | | |
|---|---|---|
| 683,752 | Great Britain | Dec. 3, 1952 |

OTHER REFERENCES

Article: Vapor Fractometry by H. H. Hausdorff, a publication of the The Perkin Elmer Corp., Norwalk, Conn. Published September 1955, page 8, copy in 73–23C.